Nov. 24, 1931.  G. E. SEELY  1,833,797
COVER FOR AUTOMOBILE SEATS
Filed Feb. 6, 1929
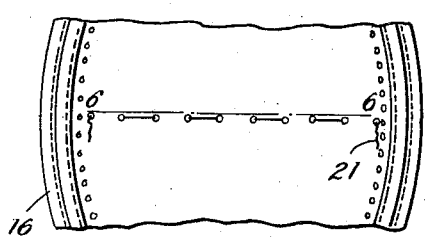
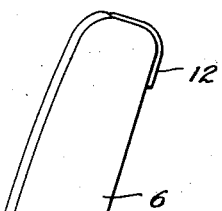
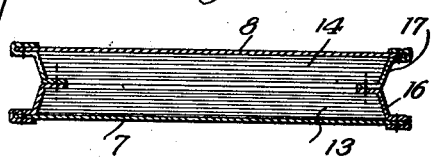
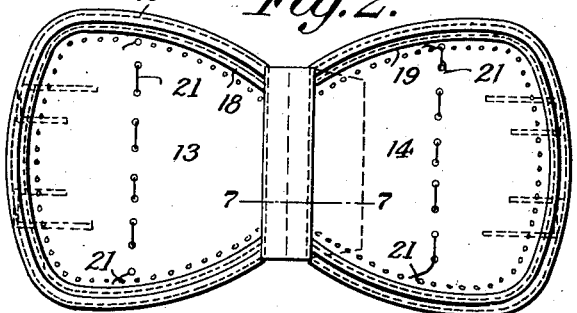
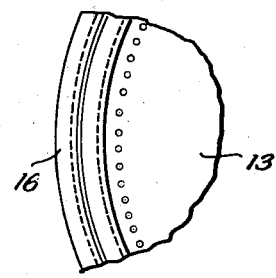
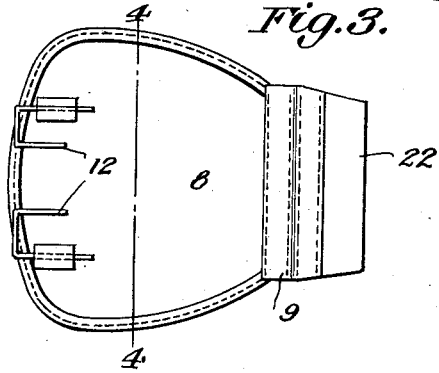
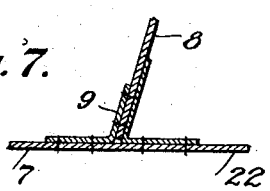
George E. Seely
INVENTOR
BY Victor J. Evans and Co.
ATTORNEYS Patented Nov. 24, 1931

1,833,797

UNITED STATES PATENT OFFICE

GEORGE E. SEELY, OF SAN FRANCISCO, CALIFORNIA, ASSIGNOR OF ONE-HALF TO RUTHERFORD B. RALPH, OF SAN FRANCISCO, CALIFORNIA

COVER FOR AUTOMOBILE SEATS

Application filed February 6, 1929. Serial No. 337,885.

This invention relates to improvements in seats and has particular reference to a temporary cover for the seats of automobiles.

The principal object of this invention is to provide a seat of the character described that is compact in form, that embodies in its construction a plurality of nested separate sheets of substantially tough material so associated that the various covers may be readily detached one from the other after each has served its purpose.

An additional object of the invention is to provide a cover of the character described that is economical to manufacture, readily foldable and transportable, strong and durable and highly efficient in use.

Other objects and advantages will be apparent during the course of the following description.

In the accompanying drawings forming a part of this specification and in which like numerals are employed to designate like parts throughout the same, Figure 1 is a side elevation of an automobile seat having my cover applied thereto, Figure 2 is a top plan view of my seat cover, Figure 3 is a top plan view having the back portion folded on the seat portion, Figure 4 is a cross sectional view taken on the line 4—4 of Figure 3, Figure 5 is a fragmentary detail view showing the manner in which the cover sheets are secured to the binding, Figure 6 is a cross sectional view taken on the line 6—6 of Figure 8, Figure 7 is a fragmentary detail view taken on the line 7—7 of Figure 2, and Figure 8 is a fragmentary detail view showing the means for tearing the sheets.

Great annoyance has been experienced by persons riding in automobiles, due to the fact that the seats are often soiled, thereby transferring grease, dirt and the like to the clothes of the occupant and particularly is this so after a car has been serviced in a garage and the seats, particularly the front driver's seat, has been subjected to contact with the soiled garments of the repair man.

In order to provide the trade with an economically constructed temporary cover for the seats of automobiles to eliminate the danger of clothes being soiled, I have provided the present invention which due to its construction is compact in form, easily transportable and highly serviceable in use.

In the accompanying drawings wherein for the purpose of illustration is shown a preferred embodiment of my invention, the numeral 5 designates the seat portion of an automobile and the numeral 6 the bark of the seat. These portions are generally covered with a fabric such as mohair, which is easily soiled. I therefore provide covers which consist of relatively flexible supporting sheets 7 and 8. These supporting sheets are hinged together by a flexible strip 9. The sheet 7 is provided with clips 11 for engaging the under portion of the seat 5, and the sheet 8 is provided with clips 12 adapted to engage the upper portion of the back 6. Carried upon the supports 7 and 8 are sheets of relatively heavy paper as shown at 13 and 14. These sheets are held to the supports as by bindings 16 and 17 respectively, thus creating what might probably be termed protector pads for both the seat portion and the back portion. The sheets 13 and 14 are perforated as shown at 18 and 19 respectively. In order to facilitate the removal of the individual sheets, a tearing thread 21 may be inserted in each sheet of each pad.

Referring to Figure 1 it will be noted that a flap 22 is provided on the hinged portion 9 and is adapted to extend between the seat portion and the back portion as shown in this figure. The result of this construction is that when the covers are placed upon the seat and back portion of an automobile, the seat material will be completely protected from the clothes of the wearer so that the seat material will not become soiled or if it is soiled, the clothes of the wearer will not become soiled. When it is desired to remove one of the sheets, the thread 21 is pulled and the sheet ripped from side to side. This permits the hand to be inserted under the rip and the sheet may then be torn from the binding through the medium of the perforations 18 or 19 as the case may be.

It will thus be seen that I have produced an invention that will accomplish all the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. As a new article of manufacture, a seat cover embodying in its construction seat and back portions hinged together, each of said portions including a plurality of connected sheets one arranged upon the other, and a rip-cord associated with each sheet to permit a sheet to be severed for freeing portions thereof to permit a person to grip and tear the respective sheet from the remaining sheets.

2. A seat cover comprising seat and back portions, means hinging the portions together, a plurality of sheets in stack formation secured to each portion and each sheet having perforations adjacent certain edges thereof, to permit severing of the sheet from the remaining sheets and the respective seat or back portions, and a rip-cord connected to each sheet.

3. A seat cover comprising seat and back portions, means hinging the portions together, a plurality of sheets in stack formation secured to each portion and each sheet having perforations to permit separation of the sheet from the remaining sheets, and the respective seat or back portion, and a rip-cord laced through certain perforations of each sheet to permit severing of the sheet whereby the latter may be gripped and torn along the remaining perforations of the sheet.

In testimony whereof I affix my signature.

GEORGE E. SEELY.